United States Patent [19]
Yount

[11] 3,782,713
[45] Jan. 1, 1974

[54] ONE MAN HOLDER FOR VEHICLES DOORS, BUMPERS AND THE LIKE DURING REPAIR THEREOF

[76] Inventor: Robert H. Yount, 1304 Hillcrest Rd., Hollister, Calif. 95023

[22] Filed: Sept. 7, 1971

[21] Appl. No.: 178,065

[52] U.S. Cl. ............... 269/297, 248/396, 29/200 P
[51] Int. Cl. ......................... B25h 1/10, B25h 5/00
[58] Field of Search .................. 269/296, 297, 309, 269/60; 254/122, 126, 133 R, 134; 29/200 P, 270, 283; 248/396, 421, 230

[56] References Cited
UNITED STATES PATENTS

| | | | |
|---|---|---|---|
| 3,292,902 | 12/1966 | Lynch | 254/122 |
| 2,546,361 | 3/1951 | Floyd | 254/122 |
| 3,404,791 | 10/1968 | Larson | 254/122 |
| 2,903,258 | 9/1959 | Jovanovich | 269/296 |
| 3,220,565 | 11/1965 | Wells | 269/134 |

Primary Examiner—Harold D. Whitehead
Attorney—Leslie M. Hansen

[57] ABSTRACT

A holder for holding vehicle parts during repairs in the nature of a pair of scissor-frames pivoted to open and close by a jack screw between the base ends of the frame and adjustable for tilting to support a vehicle door or bent bumper at an angle relative to base and means for locking the scissors frames in set positions.

4 Claims, 5 Drawing Figures

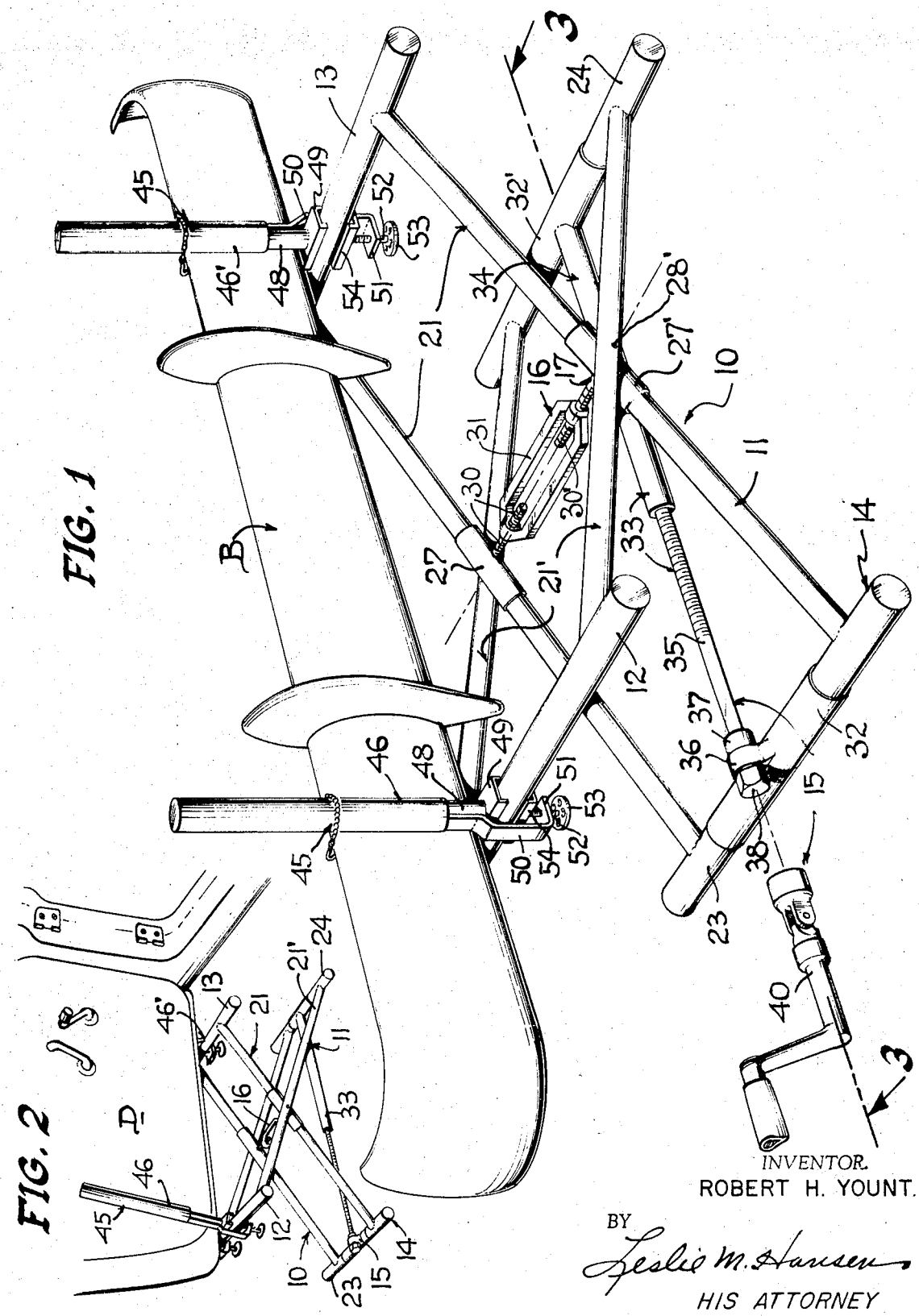

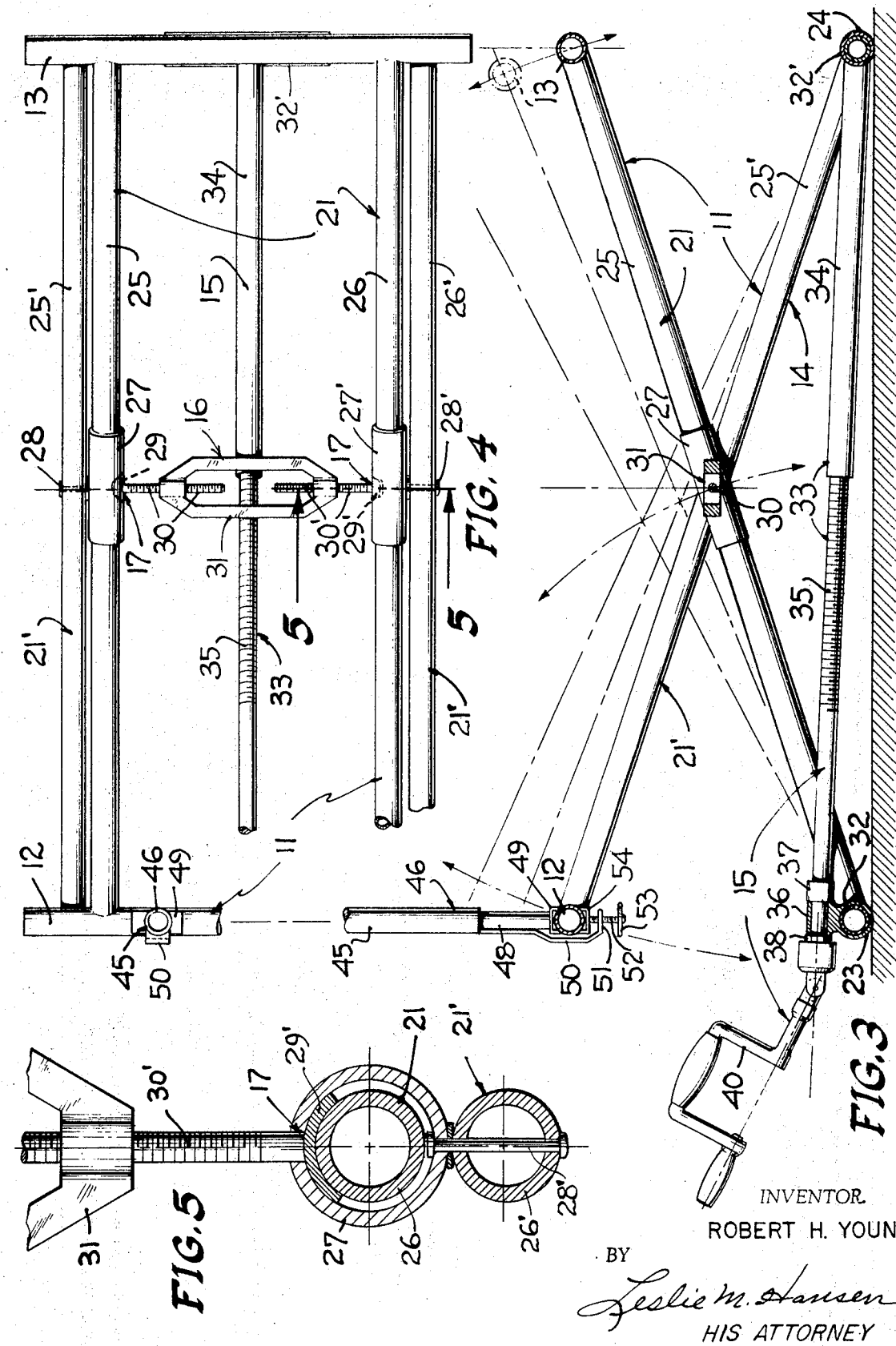

3,782,713

ONE MAN HOLDER FOR VEHICLES DOORS, BUMPERS AND THE LIKE DURING REPAIR THEREOF

BACKGROUND

This invention relates to auto repairman's tool and/or equipment for assisting in the removal and replacement of doors, bumpers and other parts of a vehicle under repair. More particularly this invention relates to a one man door and bumper holder.

The art is replete with various portable stands and devices for assisting a repairman in the self-handling of doors, bumpers and other parts of vehicles. These prior known devices are quite bulky and permanently constructed requiring floorspace even when not in use, i.e., during storage. In addition thereto these prior known devices are complex in structure and require considerable time to adjust and set-up for a particular job.

Body and fender work in auto repairs has become quite costly; mainly due to labor charges. It therefore becomes important that the repairman's time be minimized not only during the actual removal, repair and replacement of parts, but during the set-up time as well. It is therefore contemplated that the apparatus of the present invention not only provide a less expensive tool for that purpose, but one that can be easily and quickly set up for the job and be stored in a minimum of space when not in use.

STATEMENT OF INVENTION

It is an object of the present invention to provide a door and/or bumper holder which is simple in construction, economical to manufacture and highly efficient in use.

It is another object to provide a door and bumper holder which is collapsible into a compact unit during non-use and for storage or shipment.

It is yet another object to provide a door and bumper holder so constructed as to be readily and simply adjusted into a set up condition suitable for the purpose of holding either a door or a bumper and the like more quickly.

It is still another object to provide a door and bumper holder having a scissor frame. In this connection it is an object to provide a frame of two rectangular scissors legs joined by a screw tie bar for opening or raising and closing or lowering the frame into various positions of adjustment.

It is another object to provide such scissors legs of the frame with a pivotal connection which is slidable in a manner to achieve tilting of the frame to suit the angular disposition of either a door or a bumper to be removed from a vehicle.

It is yet another object to provide a locking means operatively associated with the slidable pivotal connections for setting the latter in desired positions of adjustment while simultaneously locking the frame in an adjusted position.

These and other objects and advantages of the present invention will become apparent from a reading of the following description and claims in the light of the accompanying two sheets of drawing in which:

FIG. 1 is a perspective view of the door and bumper holder of the present invention supporting a bumper;

FIG. 2 is a fragmentary perspective view at reduced scale illustrating the device of FIG. 1 supporting the door of a vehicle;

FIG. 3 is a longitudinal section of the device of FIG. 1 taken substantially along line 3—3 therein and with parts thereof removed;

FIG. 4 is a fragmentary plan view of the frame of the device of FIGS. 1 and 3; and FIG. 5 is a fragmentary sectional view through a clamp means and taken along line 5—5 in FIG. 4.

GENERAL DESCRIPTION

Referring to FIGS. 1, 2, 3 and 4 the door and bumper holder generally designated 10 includes a frame 11 having portions 12 and 13 thereof adapted to support body parts such as a door D or a bumper B and a base 14 having means 15 for elevating the body parts as well as means 16 for altering the elevation of the support portions 12 and 13 relative to each other when the body parts to be supported are tilted or at an angle relative to the base 14; and means 17 including a clamp 18 for securing the holder 10 in such a condition of elevation.

DETAILED DESCRIPTION

The frame 11 comprises a pair of legs 21 and 21' of substantially rectangular form and each including a foot portion 23–24 respectively, as well as a work support 12 and 13 each at opposite ends thereof. The foot and work support portions of each leg 21 and 21' is joined by a pair of side arms 25–26 and 25'–26', respectively. One rectangular leg 21 is narrower than the other rectangular leg 21' so as to fit between and be straddled by the side arms 25'–26' of the latter or wider leg 21'. The arms 25 and 26 of the innermost leg 21 each have a sleeve member 27–27' slidably mounted thereon for longitudinal movement therealong. Each sleeve member 27–27' is pivotally connected by a pin 28–28' to the adjacent arm 25'–26' of the outermost leg 21' of the frame 11 (FIGS. 4 and 5). The sleeve members 27 and 27' are of larger diameter than the arms 25 and 26 and have a clamp shoe 29–29', respectively, arranged therein. Each clamp shoe 29 and 29' is secured to a screw shank 30–30', respectively, which extends through an aperture formed in the sleeve member diametrically opposite and axially of the pivot pin 28 or 28' as the case may be. The screw shanks 30 and 30' have reversed threading threaded to the ends of a turnbuckle 31. This constitutes the clamp 18 of the means 17. The arrangement is such that turning of the turnbuckle in one direction draws the clamp shoes 29 and 29' inwardly and away from the arms 25 and 26 engaged thereby permitting the latter to slide axially of and relative to the sleeve members 27–27'. However, upon turning of the turnbuckle in an opposite direction the clamp shoes 29 and 29' are forced outwardly and against the respective arms 25 and 26 to thereby clampingly secure the sleeve members and their pivotal connection with the arms 25'–26' of the outermost leg 21' of the frame 11.

As best seen in FIGS. 1 and 3 each foot portion 23 and 24 of the frame 11 is adapted to rest upon a floor or pavement to provide the base 14 of the holder 10. The means 15 for elevating the support portions 12 and 13 of the frame 11 is operatively associated with the scissors arms provided by the two pivotally connected rectangular legs 21 and 21' as now to be explained.

The means 15 comprises a tubular sleeve 32 and 32' each mounted for turning movement on a respective one of the foot portions 23 and 24 and a jack screw 33 interconnecting the tubular sleeves 32 and 32'. The jack screw 33 consists of a tubular member 34 having one end welded normal to the tubular sleeve 32 and its opposite end threaded to receive one end of a threaded rod 35 having its opposite end lock journaled in a boss 36 formed as a part of the tubular sleeve 32 on the other foot portion 23. The threaded rod 35 is lock journaled to the boss 36 by a collar 37 secured to the rod on the innerside of the boss and a hex head 38 on the extreme end of the rod and outside the boss 36.

Turning of the threaded rod 35 as by a wrench, crank handle or suitable tool such as the one 40 shown in FIG. 1 causes the jack screw 33 to be extended or contracted as desired. Shortening of the length of the jack screw 33 draws the two foot portions 23 and 24 together and by reason of the scissors connection of the two legs 21-21' at pivot pins 28-28' the upper support portions 12 and 13 are elevated. By this arrangement the holder 10 can be set up with the two support portions 12 and 13 engaging the underside of a bumper like the one B shown in FIG. 1.

In the case of supporting a bumper B, after detachment thereof from a vehicle, means 45 is provided for securing the bumper to the upper support portions 12 and 13. This means 45 consists of uprights 46 and 46' adapted to be clampingly secured to the support portions 12 and 13.

Each upright 46 and 46' is identical and like reference numerals apply to each part thereof. The upright (46 or 46') consists of a bar 48 having a jaw 49 secured to its lower end to rest upon the support portion 12 or 13 as the case may be. Each bar 48 has a side bracket 50 secured thereto just above the jaw 49 and offset to extend downwardly and bypass the jaw. The lower end 51 of the bracket is turned inwardly in spaced relation to and below the jaw 49 and has the threaded shank 52 of a thumb bolt 53 threaded therethrough axially of the bar 48. A jaw 54 similar to the one 49 is swivally mounted on the upper end of the shank 52 to engage the portion 12 or 13 diametrically opposite the jaw 49 for clampingly engaging the portion thus engaged thereby when the thumb bolt 53 is tightened.

As shown in FIG. 1 the uprights 46 and 46' each have a rubber covering sheath over their upper end to prevent scratching or marring of an auto part engaged thereby. In the case of supporting a bumper B a chain or the like connected to the upright is extended around the bumper and secured to the support member 12 or 13 as the case may be. The bumper B is thus firmly secured to the holder 10 such that the latter may be moved or skidded aside for further repairs.

Referring now to FIG. 2 it will be noted that a door D when mounted on the holder 10 is held in erect position by the uprights 46 and 46' being placed on alternate sides of the door. If necessary two such uprights may be clamped to each support portion 12 and 13 to form U shaped slots between each pair of uprights to support a door D therebetween.

It will be noted in FIG. 2 that the door D of a vehicle may have a slanted condition relative to level. In other words, the lower edge of the door, when the latter is open may swing downwardly and outwardly relative to the hinges on the jamb of the door opening. Consequently, the door D must be held in such slanted condition especially during replacement in order to enable the repairman to secure the door to its hinges on the jamb of the door opening. The support portions 12 and 13 must therefore be set at different levels to accomplish this purpose. The levels of the support portions 12 and 13 are varied by changing the position of the sleeve members 27 and 27' relative to the arms 25 and 26 of the innermost leg 21. This is accomplished by releasing the turnbuckle clamp screws of the clamp means 18 to release the sleeve members 27-27' for sliding movement along the arms 25 and 26. This shifts the pivot pins 28-28' which pivotally connect the sleeve members 27-27' to the arms 25' and 26' of the outermost leg 21'. Thus the support portions 12 and 13 on the two legs 21 and 21' of the frame 11 are quickly and easily adjusted to suit the required angle of support. Thereafter the clamp means 17-18 is again tightened to maintain the door D supported at the precise position on the holder 10 and for replacement relative to the hinges on the jamb of the door opening.

It should here be noted that holder 10 may be used in support of other parts of the vehicle body needing repairs. The device can be set up and used by but one man to do the entire job thus reducing labor costs. By the same token it will be appreciated that the holder 10 of the present invention, when not in use, can be folded into a compact unit and stored in a minimum of space.

Having thus described the holder for doors and/or bumpers and the like in specific detail it will be appreciated by those skilled in the art that the same may be susceptible to modification, variations and alterations in design without departing from the spirit or scope of my invention therein as defined in the appended claims.

What I claim as new and desire to protect by Letters Patent is:

1. In combination with a one man holder for vehicle parts, such as a door, bumper and the like, during removal, repair and/or replacement thereof in which a pair of rectangular leg members each including parallel legs having a foot portion at one end and a part support at its opposite end is provided with means for interconnecting each other for opening and closing scissors fashion; means for locking said leg members at variable angles of elevation relative to each other comprising:

a a sleeve mounted for sliding movement longitudinally of and on each of the legs of one of said leg members disposed inwardly of the legs of the other one of said leg members;

b a pivot pin pivotally connecting each sleeve member to the adjacent leg of the other, outermost, on of said leg members;

c a clamp shoe confined within each of said sleeve members for bearing relation to the leg therein;

d a screw shank secured to each said clamp shoe and extending through the sleeve member confining the same, said screw shanks extending axially opposite and toward each other and each having reversed threading thereon; and e a turnbuckle having each end connected to said oppositely threaded screw shanks for expanding and contracting said clamp shoes toward and from the leg engaged thereby.

2. The one man holder in accordance with that of claim 1 including an upright adapted to be secured to each of said part support portions for engaging the sides of a vehicle part supported thereon to maintain such part in supported position between the uprights on said support portions; and means for clampingly securing each of said uprights in variable positions relative to their respective part support portion of said holder.

3. The one man holder in accordance with that of claim 2 in which said means interconnecting said legs is a jack screw comprising:
   a. a threaded member connected to the foot portion of one of said legs;
   b. a threaded rod having one end threaded into said threaded member and its opposite end lock journaled on the foot portion of the other leg; and
   c. means for turning said threaded rod for moving said foot portions toward and from each other.

4. The one man holder in accordance with that of claim 3 including:
   a. a tubular sleeve mount between said threaded member and the foot portion it is connected to; and
   a tubular sleeve on the foot portion of the other leg member and having a boss through which the said opposite end of said threaded rod is lock journaled.

* * * * *